United States Patent [19]

Rasshofer

[11] Patent Number: 4,501,873
[45] Date of Patent: Feb. 26, 1985

[54] PREPARATION OF POLYAMINES BY HYDROLYZING A POLYISOCYANATE IN THE PRESENCE OF AN ISOCYANATE-REACTIVE COMPOUND WITH WATER

[75] Inventor: Werner Rasshofer, Cologne, Fed. Rep. of Germany

[73] Assignee: Bayer Aktiengesellschaft, Leverkusen, Fed. Rep. of Germany

[21] Appl. No.: 555,241

[22] Filed: Nov. 25, 1983

[30] Foreign Application Priority Data

Dec. 4, 1982 [DE] Fed. Rep. of Germany ....... 3244913

[51] Int. Cl.$^3$ ............................................. C08G 18/82
[52] U.S. Cl. ........................................ 528/48; 528/51; 528/52; 528/53; 528/55; 528/57; 528/58; 528/73; 528/75; 528/76; 528/77; 528/78; 528/80; 528/81; 528/83; 528/84; 528/85
[58] Field of Search ........................ 528/48, 51, 52, 53, 528/55, 57, 58, 73, 75, 76, 77, 78, 80, 81, 83, 84, 85

[56] References Cited

U.S. PATENT DOCUMENTS

| 2,888,439 | 5/1959 | Simons | 260/77.5 |
|---|---|---|---|
| 3,044,989 | 7/1962 | Shivers, Jr. | 260/77.5 |
| 3,236,895 | 2/1966 | Lee et al. | 260/584 |
| 3,385,829 | 5/1968 | Heydkamp et al. | 260/75 |
| 3,625,871 | 12/1971 | Troubel et al. | 260/2.5 AY |
| 3,808,250 | 4/1974 | Blahak | 260/455 R |
| 3,865,791 | 2/1975 | Brinkmann et al. | 260/77.5 |
| 3,984,370 | 10/1976 | Shinohara et al. | 260/37 EP |
| 4,129,741 | 12/1978 | Schmidt et al. | 560/50 |
| 4,153,801 | 5/1979 | Schmidt et al. | 548/312 |
| 4,163,831 | 8/1979 | Gessell | 526/153 |
| 4,169,206 | 9/1979 | Mazanek et al. | 560/50 |
| 4,172,050 | 10/1979 | Gessell | 252/431 R |
| 4,180,644 | 12/1979 | Marquis et al. | 528/68 |
| 4,224,417 | 9/1980 | Hajek et al. | 521/166 |
| 4,386,218 | 5/1983 | Rasshofer et al. | 564/38 |

FOREIGN PATENT DOCUMENTS

| 61627 | 3/1981 | European Pat. Off. . |
|---|---|---|
| 48369 | 9/1981 | European Pat. Off. . |
| 1193671 | 5/1969 | Fed. Rep. of Germany . |
| 2948419 | 8/1981 | Fed. Rep. of Germany . |
| 3039600 | 2/1982 | Fed. Rep. of Germany . |
| 3112118 | 8/1982 | Fed. Rep. of Germany . |
| 1308345 | 9/1962 | France . |
| 1466708 | 12/1966 | France . |
| 920475 | 3/1963 | United Kingdom . |
| 1033912 | 6/1966 | United Kingdom . |
| 1117494 | 6/1968 | United Kingdom . |

OTHER PUBLICATIONS

Walker and Pinches, "Analyst", 104, 928–936 (1979).
H. John, J. Prakt. Chem. 130, 314 et seq. and 332 et seq. (1931).
N. V. Sidgwick, The Organic Chemistry of Nitrogen, Clarendon Press, Oxford, 1966, p. 236.

Primary Examiner—Maurice J. Welsh
Attorney, Agent, or Firm—Gene Harsh; Joseph C. Gil; Lyndanne M. Whalen

[57] ABSTRACT

High molecular weight aromatic polyamines are produced by hydrolyzing a polyisocyanate having an isocyanate content of from 21 to 52.5% and an isocyanate-reactive group-containing compound having a molecular weight of from 400 to 10,000 in the presence of an excess of water. The reactants are used in quantities such that the equivalent ratio of isocyanate to isocyanate-reactive groups is from 0.1 to 5. Further, water is used in an amount such that the equivalent ratio of water to isocyanate groups is greater than 1. Low molecular weight compounds containing isocyanate-reactive groups, solvents, basic catalysts and urethanization catalysts may also be included in the mixture to be hydrolyzed. The hydrolysis is carried out at a temperature of from −20° to 175° C. The product amine is isolated from the reaction mixture by procedures such as phase separation, extraction and distillation. The polyamines thus-produced are particularly useful in the production of polyurethanes.

15 Claims, No Drawings

PREPARATION OF POLYAMINES BY HYDROLYZING A POLYISOCYANATE IN THE PRESENCE OF AN ISOCYANATE-REACTIVE COMPOUND WITH WATER

BACKGROUND OF THE INVENTION

This invention relates to a simplified process for the preparation of relatively high molecular weight polyamines in which the starting materials react at least partly to undergo urethane linkage and isocyanate groups are saponified to $NH_2$ groups either at the same time and/or subsequently. The present invention also relates to relatively high molecular weight polyamino compounds prepared by this process.

Processes in which the amino groups of polyamines are formed from isocyanate groups of polyisocyanates or preformed isocyanate prepolymers are known to those skilled in the art. For example, it is known that aromatic isocyanates may be converted into primary aromatic amines by acid hydrolysis. However, the amine formed as a result of hydrolysis continues to react with unreacted isocyanate to form the corresponding urea. This secondary reaction cannot be suppressed even by using an excess of strong mineral acid. A comparatively recent example of this procedure is found in Japanese Pat. No. 55 007-827.

Acid hydrolysis of aliphatic monomeric isocyanates with dimethylsulfoxide/hydrochloric acid to form amines was disclosed by Walker and Pinches in "Analyst", 104, 928–936 (1979) as a method of detecting the presence of aliphatic isocyanates. In this process, the amines are derived from the corresponding modified or unmodified isocyanates or prepolymers (for example hexamethylenediamine obtained from biuretized hexamethylene diisocyanate) and their concentration is determined photometrically.

DE-B No. 1 270 046 discloses a process for the preparation of particular primary aromatic amines containing polyalkylene glycol ether segments, in which reaction products of aromatic di- or triisocyanates and polyalkylene glycol ethers and/or polyalkylene glycol thioethers (preferably those having molecular weights from 400 to 4000) are reacted with secondary or tertiary carbinols and subsequently (optionally in the presence of acid catalysts) subjected to thermal decomposition at high temperatures in an inert solvent. This process is disadvantageous in that high decomposition temperatures are required and the thermal decomposition of the urethanes is accompanied by the formation of combustible, readily volatile alkenes which form explosive mixtures with air. Special precautions are therefore required.

DE-B No. 1 694 152 discloses the preparation of prepolymers containing at least two amino end groups by reacting excess quantities of hydrazine, aminophenylethylamine or other diamines with an isocyanate prepolymer obtained from a polyether polyol and polyisocyanate (NCO:NH ratio=1:1.5 to 1:5). Any unreacted amine must be carefully removed in a subsequent step because the amine acts as both a reactant and a powerful catalyst for the reaction with polyisocyanates and thus causes shortened processing times.

Another possible method for synthesizing polyamines containing urethane groups has been described in French Patent No. 1,415,317. In this disclosed process, isocyanate prepolymers containing urethane groups are reacted with formic acid to form N-formyl derivatives which are saponified to terminal aromatic amines.

The reaction of isocyanate prepolymers with sulfamic acid according to DE-B No. 1,155,907 results in compounds having amino end groups. Relatively high molecular weight prepolymers containing aliphatic, secondary and primary amino groups are obtained, according to DE-B No. 1,215,373, by the reaction of relatively high molecular weight hydroxyl compounds with ammonia in the presence of catalysts under pressure and at high temperatures. Such high molecular weight prepolymers may also be obtained according to U.S. Pat. No. 3,044,989 or DE-B No. 1,193,671 by the reaction of relatively high molecular weight polyhydroxyl compounds with acrylonitrile followed by catalytic hydrogenation. Polyoxyalkylene polyamines may be produced according to U.S. Pat. No. 3,236,895 by amination with ammonia of sulfonic acid esters of polypropylene glycol. The reaction of a polyalkylene glycol with epichlorohydrin followed by a reaction with an excess of a primary amine to obtain products having secondary amino groups has been disclosed in French Patent No. 1,466,708. According to DE-A No. 2,546,536 and U.S. Pat. No. 3,865,791, relatively high molecular weight compounds having terminal amino groups and urethane groups may be obtained by reacting isocyanate prepolymers with hydroxyl group-containing enamines, aldimines or ketimines and then hydrolyzing the product. Another possibility of synthesizing aromatic polyamines containing urethane and ether groups lies in the ring opening which occurs in the reaction between isatoic acid anhydride and diols. Such polyamines have been described, for example, in U.S. Pat. No. 4,180,644 and DE-A Nos. 2,019,432; 2,619,840; 2,648,774 and 2,648,825. One disadvantage of such processes is the low reactivity of aromatic ester amines obtained.

The reaction of nitroarylisocyanates with polyols followed by reduction of the nitro groups to aromatic amino groups is also known (see U.S. Pat. No. 2,888,439).

Polyamines may also be prepared by the reaction of benzyl alcohol with isocyanate compounds having aliphatic or aromatic isocyanate groups to form benzylurethanes which are subsequently catalytically hydrogenated (DE-A No. 3,035,639). One major disadvantage of both these processes is the high cost of the reduction step carried out under pressure.

It is also known that certain heteroaromatic isocyanic acid esters may be converted into heteroaromatic amines by alkaline hydrolysis. The conditions of hydrolysis mentioned in H. John, J. Prakt. Chem. 130, 314 et seq and 332 et seq (1931) for two quite specific heteroaromatic monoisocyanic acid esters are however completely unsuitable for the conversion of polyisocyanate compounds into aliphatic and/or aromatic amines and also dangerous.

Another possible method for alkaline hydrolysis of isocyanate groups is disclosed in N. V. Sidgwick, The Organic Chemistry of Nitrogen, Clarendon Press, Oxford, 1966, page 236. This disclosure is however very general.

Various proposals disclosed in DE-A Nos. 2,948,419; 3,039,600 and 3,112,118 are multistage processes for the preparation of polyamines by alkaline hydrolysis of isocyanate prepolymers to carbamates. The hydrolysis is carried out at low temperatures using aqueous alkali metal hydroxide. The hydrolyzed mixture is then acidified with mineral acids or acid ion exchange resins in quantities equivalent to or in excess of the quantity of base and $CO_2$ is given off. The mixture may then be neutralized and the product polyamines isolated therefrom. The carbamates may also be directly decomposed by heat to give rise to the polyamines without addition of acid.

The processes described above for the preparation of polyamines involve considerable expense. Even in the more simplified processes using prepolymers for the conversion of polyisocyanates into polyamines, a further simplification would be economically desirable. Since the isocyanate prepolymers must first be prepared from polyols and monomeric polyisocyanates before they are hydrolyzed and a major portion of the cost of such processes lies in the preparation, storage and handling of the isocyanate prepolymer, it would be advantageous to have a simplified process for producing polyamines which process does not require a prepolymer as the starting material.

SUMMARY OF THE INVENTION

It is an object of the present invention to provide a process for the production of relatively high molecular weight polyamines.

It is also an object of the present invention to provide an economically attractive process for the production of high molecular weight polyamines in which preliminary preparation of a prepolymer is not required.

It is a further object of the present invention to provide a one-step process for the production of relatively high molecular weight polyamines.

It is another object of the present invention to provide a process for the production of high molecular weight polyamines in which the starting materials for isocyanate prepolymer formation are mixed in the presence of excess quantities of water and subsequently react to form urethane linkages and amino groups simultaneously.

It is yet another object of the present invention to provide relatively high molecular weight polyamines and polyamine mixtures which contain amino end groups and may also contain other isocyanate-reactive end groups such as OH groups which polyamines are particularly useful in the production of polyurethanes.

These and other objects which will be apparent to those skilled in the art are accomplished by hydrolyzing a polyisocyanate having an isocyanate content of from 21 to 52.5 wt. % in presence of an isocyanate-reactive compound (molecular weight from 400 to 10,000) mixed with an excess of water (based on isocyanate groups). These reactants are used in quantities such that the equivalent ratio of isocyanate groups to isocyanate-reactive groups is from 0.1 to 5. The reaction mixture may also contain a low molecular weight (i.e., 62 to 399) isocyanate-reactive compound, an at least partly water-miscible solvent and an alkaline catalyst. The mixing of the reactants may be conducted at a temperature of from $-20°$ to $175°$ C. The hydrolysis is carried out at a temperature of from $20°$ to $175°$ C. The product polyamine may be isolated from the reaction mixture by phase separation or extraction or as a residue after removal of the volatile constituents by distillation.

DETAILED DESCRIPTION OF THE INVENTION

The present invention relates to a process for the preparation of relatively high molecular weight aromatic polyamines linked by urethane groups to segments of relatively high molecular weight polyether, polyester, polycarbonate or polyacetal polyols and optionally also to residues of low molecular weight compounds having isocyanate reactive end groups. These polyamines are produced by a one-step basic hydrolysis at temperatures from $-20°$ C. to $175°$ C., preferably at $20°$ C. to $130°$ C. More specifically, polyisocyanates, preferably diisocyanates having an isocyanate content of from 21 to 52.5 wt % (preferably from 30 to 48.3 wt. %) and preferably aromatically bound isocyanate groups, and relatively high molecular weight, divalent or higher valence (preferably divalent to tetravalent) compounds having isocyanate reactive groups and a molecular weight of from 400 to 10,000 (preferably from 500 to 6000) polyether, polyester, polycarbonate or polyacetal polyols, optionally in the presence of low molecular weight divalent or higher valence (preferably di- or trivalent) isocyanate-reactive compounds (preferably diols and/or polyols) having a molecular weight of from 62 to 399 (preferably from 62 to 250) are mixed with excess quantities of water (based on the isocyanate groups) optionally in the presence of solvents which are at least partly water-miscible and optionally in the presence of alkaline catalysts (preferably alkali metal hydroxides and alkaline earth metal oxides and hydroxides, alkali metal and alkaline earth metal carbonates and alkali metal bicarbonates, difficultly soluble basic aluminum oxides or basic ion exchange resins and tertiary organic amines) at an NCO/XH equivalent ratio (X=O, NH) of 0.1 to 5 (preferably 0.5 to 2), and at an $H_2O$/NCO ratio $>1:1$, preferably $>10:1$. This reaction mixture is heated to temperatures of from $20°$ C. to $175°$ C., preferably from $60°$ C. to $100°$ C., preferably with stirring. The relatively high molecular weight polyamine reaction product may be isolated from the reaction mixture by phase separation or extraction or preferably isolated as residue by the removal of the volatile constituents from the reacton mixture by distillation.

The present invention also relates to the amino group-containing products obtained by this process. These products contain a major portion having amino end groups, a certain quantity of compounds containing isocyanate-reactive groups, a low molecular weight polyamine (such as is obtained by hydrolysis of the isocyanate groups of the low molecular weight polyisocyanate used in the process of the invention into amino groups) and a minor proportion of an only one-sided linkage of isocyanate-reactive compound with isocyanate (e.g., aminoalcohol derivatives).

The polyamines prepared by the process of the present invention may be obtained at much lower cost than those obtained by prior art processes. Further, when compared with the products of prior art processes, the polyamines of the present invention are significantly more highly fluid and therefore easier to handle. Another advantageous feature of the polyamines of the present invention is that when they are worked up into foamed and unfoamed plastics based on polyurethanes, their mechanical properties are comparable to those obtained using only aminopolyethers or a mixture of aminopolyethers and other relatively high molecular weight compounds containing isocyanate reactive groups (so-called "H-active groups") such as hydroxypolyethers.

Conversion of the low molecular weight polyisocyantes in the presence of the relatively high molecular weight polyhydroxyl compounds is carried out as a simple and economical one-shot process without previous formation of isocyanate prepolymers. The starting components used in the process of the present invention are inexpensive and industrially available in large quantities. Conventional reactor tanks may be used without any special apparatus or devices. The process may advantageously be carried out continuously. Furthermore, the process is environmentally safe because it may be carried out without the use of solvents, only small quantities of carbon dioxide are released into the atmosphere and only readily removable carbonic acid salts or aqueous solutions thereof are formed.

The polyisocyanates used in the process of the present invention may in principle be any aromatic, aliphatic, cycloaliphatic or heterocyclic polyisocyanates. Such isocyanates are described, for example, by W. Siefken in Justus Liebigs Annalen der Chemie, 562, pages 72–136. Appropriate isocyanates include those corresponding to the formula Q (NCO)$_n$, in which n=2 to 4 (preferably 2) and Q represents a hydrocarbon group having 4 to 15 carbon atoms, or an aromatic hydrocarbon group having 6 to 15 (preferably 6 to 13) carbon atoms. Aromatic polyisocyanates such as 1,3- and 1,4-phenylene diisocyanate or 2,4- and 2,6-tolylene diisocyanate or any mixtures of these isomers, diphenylmethane-diisocyanates and diphenyl-2,4'- and/or 4,4'- and/or 2,2'-diisocyanates, including mono- to tetra-$C_1$-$C_8$-alkyl- and/or chlorine-substituted derivatives thereof and naphthylene-1,5-diisocyanate are preferred. The 2,4'-diisocyanatodiphenylsulfides described in DE-A No. 2,922,966 and the alkyl-substituted diphenylmethane diisocyanates described, for example, in EP No. 24,655 and DE-A No. 2,935,318 are also suitable diisocyanates.

Aliphatic and/or cycloaliphatic polyisocyanates such as 1,6-hexanediisocyanate, lysine methyl ester diisocyanate, isophorone diisocyanate, dicyclohexylmethane diisocyanates and polyisocyanates based on hexane-1,6-diisocyanate or isophorone diisocyanate and containing biuret groups or isocyanurate groups may also be used. Polymer modified polyisocyanates (according to EP-A No. 37,112 and DE-A No. 3,223,396) are also suitable isocyanates.

Less suitable are those polyisocyanates which have three or more isocyanate groups in the molecule, such as triphenylmethane-4,4',4"-triisocyanate or polyphenyl-polymethylene polyisocyanates (trinuclear and higher nuclear diisocyanates).

Particularly preferred, however, are the 2,4- and/or 2,6-tolylene diisocyanates, 4,4'- and/or 2,4'-diisocyanato-diphenylmethane and the $C_1$-$C_4$-mono- to tetraalkyl derivatives thereof. Among the aliphatic diisocyanates, which on the whole are less preferred, hexamethylene diisocyanate, isophorone diisocyanate and the isomeric dicyclohexylmethane-4,4'-diisocyanates are preferred.

Isocyanate prepolymers which have been preformed or so-called semi-prepolymers based on relatively high molecular weight polyhydroxyl compounds are not used in the present invention.

The high molecular weight isocyanate-reactive compounds used in the present invention include compounds having at least two groups containing isocyanate-reactive H-atoms ("H-active groups") such as primary and/or secondary hydroxyl groups and/or primary and/or secondary amino groups and/or thiol groups, preferably 2 or more primary hydroxyl groups.

Examples of such compounds are the polyacetals, polythioethers, polycarbonates, polyamides, polysiloxanes, polylactones and/or polybutadienes with "H-active" groups especially polyethers conventionally used in polyurethane chemistry. The H-active groups are preferably hydroxyl groups. Such relatively high molecular weight polyhydroxyl compounds may be prepared, for example, by the polymerization of tetrahydrofuran or of epoxides such as ethylene oxide, propylene oxide, butylene oxide, isobutylene oxide, styrene oxide and/or epichlorohydrin on their own (for example in the presence of Lewis catalysts such as boron tirfluoride) or by chemical addition of these epoxides (preferably ethylene oxide and/or propylene oxide, either mixed together or consecutively) to starting components having reactive hydrogen atoms. Examples of appropriate starting components are water; alcohols, such as ethylene glycol, (1,3)- or (1,2)-propane diol, trimethylolpropane, glycerol, sorbitol and 4,4'-dihydroxy-diphenylpropane; ammonia and amines such as aniline, ethanolamine and ethylenediamine. Sucrose polyethers and polyethers which have been started on formitol or formose may also be used in the present invention. It is frequently preferred to use polyethers containing predominantly primary OH groups (up to 90 wt. %, based on all the OH groups present in the polyether).

Polybutadienes containing OH, NH and/or SH groups are also suitable according to the invention (see Progress Org. Coatings, Volume 7 (3), 289–329 (1979)).

Suitable polyacetals include compounds prepared from glycols such as diethylene or triethylene glycol, 4,4'-dihydroxy-ethoxydiphenylmethane, hexanediol and formaldehyde or by the polymerization of cyclic acetals, e.g. trioxane.

Suitable polycarbonates containing hydroxyl groups are known and include, for example, those obtained by the reaction of diols such as propane-1,3-diol, butane-1,4-diol and/or hexane-1,6-diol, di- tri- or tetraethylene glycol or thiodiglycol with diarylcarbonates such as diphenylcarbonate or phosgene.

Among polyethers, the condensation products obtained by the reaction of thiodiglycol on its own and/or with other glycols are particularly preferred. Polyhydroxyl compounds already containing urethane or urea groups and modified or unmodified natural polyols may also be used. Products of addition of alkylene oxides to phenol formaldehyde resins or to urea formaldehyde resins may also be used in the present invention. Amide groups may also be introduced into the polyhydroxyl compounds.

Polyhydroxyl compounds containing high molecular weight polyadducts or polycondensates or polymers in a finely dispersed or dissolved form may also be used in the present invention. Such polyhydroxyl compounds may be obtained when polyaddition reactions (e.g. reactions between polyisocyanates and amino-functional compounds) or polycondensation reactions (e.g. between formaldehyde and phenols and/or amines) are carried out in situ in the above-mentioned compounds containing hydroxyl groups. Alternatively, such polyhydroxyl compounds may be obtained by mixing previously prepared aqueous polymer dispersions with a polyhydroxyl compound and then removing the water from the mixture.

Polyhydroxyl compounds modified by vinyl polymers such as the polyhydroxyl compounds obtained by the polymerization of styrene and acrylonitrile in the presence of polyethers or polycarbonate polyols are also suitable for the process of the present invention.

Other examples of high molecular weight isocyanate-reactive compounds which may be used in the present invention are described, for example, in High Polymers, Vol. XVI, "Polyurethanes, Chemistry and Technology" by Saunders-Frisch, Interscience Publishers, New York, London, Volume I, 1962, pages 32–42 and pages 44–54, and Volume II, 1964, pages 5–6 and 198–199, and in Kunststoff-Handbuch, Volume VII, Vieweg-Hochtlen, Carl-Hanser-Verlag, Munich, 1966, e.g. on pages 45–71. It is, of course, also possible to use mixtures of the above-mentioned compounds containing at least two isocyanate-reactive hydrogen atoms and having molecular weights of from 400 to 12000 (e.g. mixtures of various polyethers).

Low molecular weight isocyanate-reactive compounds useful in the present invention contain at least two isocyanate-reactive hydrogen atoms ("H-active groups") and have a molecular weight of from 62 to 399, preferably from 62 to 250. These compounds may contain hydroxyl groups and/or amino groups and/or thiol groups, preferably hydroxyl groups. Such compounds include those known in polyurethane chemistry as chain-lengthening or cross-linking agents. These compounds generally have from 2 to 8, preferably from 2 to 4 isocyanate-reactive hydrogen atoms. These compounds may also be used as mixtures of various compounds containing at least two isocyanate reactive hydrogen atoms and having molecular weights of from 62 to 399, preferably, from 62 to 250.

Specific examples of such compounds are diols or polyols such as ethylene glycol (1,2)- and (1,3)-propanediol, (1,4)-, (1,3)- and (2,3)-butanediol, (1,5)-pentanediol, (1,6)-hexanediol, (1,8)-octanediol, neopentyl glycol, 1,4-bis-hydroxy-methyl-cyclohexane, 2-methyl-1,3-propane diol, dibromobutenediol, glycerol, trimethylopropane, (1,2,6)-hexanetriol, trimethylolethane, pentaerythritol, quinitol, mannitol and sorbitol, dianhydrosorbitol and dianhydromannitol, castor oil, di-, tri- and tetra-ethyleneglycol, di-, tri- and tetra-propyleneglycol, dibutylene glycol and higher polyoxyethylene-, polyoxypropylene- and polyoxybutylene glycols having a molecular weight of up to 399, 4,4'-dihydroxy-diphenylpropane, dihydroxy-ethylhydroquinone, ethanolamine, diethanolamine, N-methyl-diethanolamine, triethanolamine and 3-aminopropanol.

The low molecular weight polyols used may also be mixtures of hydroxyaldehydes and hydroxyketones ("formoses") or the polyhydric alcohols ("formitol") obtained therefrom by reduction, such as those resulting from the autocondensation of formaldehyde hydrate.

The relatively high molecular weight compounds containing hydroxyl groups are preferably polyether polyols and inclusion of diols or polyols within the molecular weight range of from 62 to 399 is also preferred.

The inclusion of low molecular weight compounds such as aliphatic diamines or aromatic diamines is less preferred. Examples of such aromatic diamines include 3,3'-dichloro-4,4'-diaminodiphenylmethane, the tolylene diamines, 4,4'-diaminodiphenylmethane, 4,4'-diaminodiphenyl disulfides, diaminodiphenyldithioether, aromatic diamines substituted by alkylthio groups, and aromatic diamines containing sulfonate or carboxylate groups. Amino-alkylthioanilines are examples of aliphatic-aromatic diamines.

Examples of classes of solvents suitable for use as organic solvents which are at least partly miscible with water include: water-soluble aliphatic or cycloaliphatic acid amides having 1 to 10 carbon atoms such as dimethylformamide, diethylformamide, N-methylpyrrolidone, dimethylacetamide, caprolactam and formamide (with dimethylformamide dimethylacetamide and N-methylpyrrolidone being preferred); water-soluble ethers of ethylene glycol (such as ethylene glycol dimethylether and ethylene glycol diethylether); water-soluble ethers of diethylene glycol (such as diethyleneglycol dimethylether and diethyleneglycol monomethylmonobutylether); water-soluble ethers of triethylene glycol such as triethylene glycol dimethylether, or of propylene glycol, cyclic ethers such as tetrahydrofuran, alkyl-substituted tetrahydrofuran such as 2,5-dimethyl-tetrahydrofuran, and dioxanes such as 1,4-dioxane; water-soluble, tetraalkylated aliphatic ureas and thioureas having 4 to 12 C-atoms, e.g., tetramethylureas or tetraethylureas; water-soluble, aliphatic or cycloaliphatic sulfones or sulfoxides having 2 to 10 carbon atoms such as tetramethylenesulfone or dimethylsulfoxide; water-soluble, aliphatic or cycloaliphatic phosphoric acid amides such as hexamethylphosphoric acid triamide; acetonitrile, partially water-soluble propionitrile; and water-soluble ketones such as acetone and partially water-soluble ketones such as methyl ethyl ketone.

The solvents may also be used as mixtures in any proportions. Among the solvents mentioned, it is preferred to use those which have a boiling point at normal pressure of from 56° C. to 250° C., preferably from 64° C. to 165° C., because working up is facilitated.

Preferred water-miscible solvents are: Dimethylformamide, dimethylacetamide, acetonitrile, acetone, methyl ethyl ketone and 1,4-dioxane. Less preferred is the use of solvents containing isocyanate reactive groups, including alcohols such as i-propanol, t-butanol and ethyl glycol.

It is also less preferred to use co-solvents which are substantially water-insoluble in addition to the water-soluble solvents. These less preferred substantially water-insoluble solvents include chlorinated and/or fluorinated aliphatic hydrocarbons such as di-, tri- and tetrachloromethane, trichlorofluoromethane and trichloroethane; aliphatic or aromatic hydrocarbons such as hexane or heptane; hydrocarbon mixtures of the petroleum ether or benzene type; benzene, toluene, xylenes and higher alkylated aromatic compounds; and halogenated or nitrated aromatic compounds such as chlorobenzene or nitrobenzene.

The at least partially water-miscible solvent should comprise from 60 to 100% of the total solvent. It is preferred that the solvent be entirely water-miscible and contain cyclic or acyclic amides, ether, urea, sulfoxide, sulfone, phosphoric acid amide, nitrile or keto groups. Up to 40% of the total solvent may be solvents which have been described as less suitable.

The total proportion of solvent or solvent mixtures used (based on 100 parts of isocyanate plus isocyanate-reactive compounds plus water plus catalyst), is from 0 to 200 parts, preferably from 0 to 100 parts, most preferably from 0 to 25 parts. It is immaterial to the process of the present invention whether the reaction mixture is homogeneous and monophasic or a dispersion or an emulsion or whether the isocyanate is soluble in the water-miscible solvent. However, working up is generally much simpler if two phases are present at the end of the reaction.

The basic catalysts may be inorganic or organic compounds and may be soluble or insoluble. Examples of appropriate basic catalysts are hydroxides of the 1st, 2nd and 3rd Main Groups in particular hydroxides of the 1st and 2nd Main Group, including sodium hydroxide and potassium hydroxide; oxides of the 1st and 2nd Main Groups; carbonates and bicarbonates, preferably of metals of the 1st Main Group, such as sodium and potassium bicarbonate or soda and potash; carboxylates of preferably monobasic carboxylic acids such as formic, acetic or ethyl hexanoic acid with metals of the 1st and 2nd Main Group of the Periodic System (in particular the 1st Main Group) such as potassium acetate, octoate and ethyl hexanoate; carbonates, bicarbonates and carboxylates of inorganic ammonium salts ($NH_4^+$, $N^+R_3H$, $N^+R_2H_2$, $N^+RH_3$) and carbonates, bicarbonates, carboxylates and hydroxides of organic tetraalkylammonium ($C_1$–$C_{18}$-alkyl groups); alkali metal and alkaline earth metal salts of weak acids such as silicic acid, hydrocyanic acid, cyanic acid, thiocyanic acid, isocyanic acid, isothiocyanic acid and hydrogen sulfide, which are strongly alkaline in reaction in water due to hydrolysis. Other suitable catalysts include: water-soluble alkali metal salts derived from acids such as ethylene diaminotetracetic acid, nitrilotriacetic acid, cyclohexylene tetracetic acid, hydroxyethylethylene diaminotriacetic acid, 2-hydroxy-1,3-diaminopropylene tetracetic acid, diethylene triaminopentacetic acid, cyclamotetracetic acid and aminopropionic carboxylic acid salts like those mentioned in DE-A No. 2,451,013, such as the potassium salt of morpholino-N-propionic acid and the dipotassium salt of piperazino-N,N'-dipropionic acid and of N-cyclohexyl-nitrilodipropionic acid.

Alkali metal salts of mercaptans, e.g. sodium n-butylmercaptide, lithium decylmercaptide, lithium 2-ethyl-6-hydroxyethylmercaptide, sodium carboxymethyl mercaptide, potassium phenylmercaptide, the potassium salt of 2-aminothiophenol and other mercaptides such as those mentioned in DE-A No. 2,314,865 may also be used.

Tertiary amines are also basic catalysts suitable to the present invention. Tertiary amines having an aliphatic or cycloaliphatic structure and mixtures of such tertiary amines are preferred. Examples include compounds which are in most cases not completely water-soluble such as trialkylamines like trimethylamine, triethylamine, tripropylamine, triisopropylamine, dimethyl-n-propylamine, tri-n-butyl amine, triisobutylamine, triisopentylamine, dimethylbutylamine, triamylamine, dioctylhexylamine, dodecyldimethylamine, dimethylcyclohexylamine, dibutylcyclohexylamine, dicyclohexylethylamine and tetramethyl-1,3-butanediamine. Tertiary amines having an araliphatic group, such as dimethylbenzylamine, diethylbenzylamine or α-methylbenzyl-dimethylamine are also included. Trialkylamines having a total of 6 to 15 C-atoms such as triethylamine to triamylamine and dimethylcyclohexylamine are preferred.

Apart from trialkylamines, tertiary amines which carry another tertiary amino or ether group, especially in the β-position to the tertiary group, are also very suitable. Examples of such amines are: dialkylaminoalkyl ethers and bis-dialkylaminoalkylethers (U.S. Pat. No. 3,330,782, DE-B No. 1,030,558) such as dimethyl-(2-ethoxyethyl)-amine, diethyl-(2-methoxypropyl)-amine, bis-(2-dimethylamino-ethyl)-ether, bis-(2-diethylaminoethyl)-ether, bis-(2-diethylaminoisopropyl)-ether, 1-ethoxy-2-dimethylaminoethoxyethane, N-methyl-morpholine, N-ethyl-morpholine and N-butyl-morpholine; permethylated polyalkylenediamines such as tetramethylethylenediamine, tetramethyl-1,2-propylenediamine, pentamethyldiethylenetriamine, hexamethyltriethyltetramine and higher permethylated homologues (DE-A Nos. 2,624,527 and 2,624,528); diethylaminoethyl piperidine, 1,4-diaza-(2,2,2)-bicyclooctane, N,N'-dimethylpiperazine, N,N'-diethylpiperazine, N-methyl-N'-dimethylaminoethyl-piperazine, N,N'-bis-dimethylaminoethylpiperazine, N,N'-bis-dimethylaminopropylpiperazine as well as other bis-dialkylaminoalkylpiperazines mentioned in DE-A No. 2,636,787; N-dialkyl-aminoethylmorpholines mentioned in EP-A No. 54,219; 4-dialkylaminopyridine and 4-pyrrolidinopyridine mentioned in Angew. Chem. 90, 602 (1978) and dialkylaminoalkyloxazolidines according to DE-A No. 3,033,832. From this group, watersoluble compounds such as tetramethylethylenediamine, permethylated diethylene triamine and N-methylmorpholine, 2-(2-dimethylaminoethyl)-ether and N-methylpiperidine are preferred.

The following materials may be used as catalyst: Tertiary amino compounds containing urea groups according to DE-A No. 3,027,796; acylated tertiary amino groups according to DE-A Nos. 2,425,448, 2,523,663 and 2,732,292; perhydrotriazines having tertiary amino groups according to DE-A No. 2,422,335; tetramethylguanidine; 1,3-bis-(dialkylaminoalkyl)guanidines according to EP No. 33,879 (DE-A No. 3,003,978); pentasubstituted guanidines according to Canadian Patent No. 918,675; catalysts containing guanidine groups according to DE-A No. 3,018,023; tetrahydropyrimidines according to DE-B No. 2,439,005 or Japanese Patent No. 7,102,672; substituted cyclic and acylics amidines according to DE-A No. 1,950,262; cyclic amidines according to DE-B No. 1,745,418 (U.S. Pat. No. 3,769,244), U.S. Pat. No. 3,814,707 and DE-A No. 3,041,834; and cyclic propionitriles according to DE-A No. 2,419,304.

It is preferred to use those tertiary amines which have a marked resistance to hydrolysis so that they may be recovered unchanged. It is also preferred to use amines which are water-soluble and/or boil at temperatures below 200° C. at normal pressure. Resistance to hydrolysis and/or solubility in water are often improved if the amine compound is present in the salt form. The salts of these amines with weak acids such as carbonic acid (if the carbonic acid salts are stable) or oleic acid or ricinoleic acid may also be used in the process of the present invention. Other tertiary amines suitable for the process of the present invention include azacrown ethers containing tertiary amine nitrogen atoms and cryptands but these are not preferred because of their high cost.

In addition to thse catalysts (which are also referred to as bases in this text), catalysts which are Lewis acids of metal compounds and which are conventionally used as urethanization catalysts in polyurethane chemistry may also be used. These catalysts include the known lead, zinc and tin compounds. Tin compounds and especially those tin compounds which are resistant to hydrolysis, such as tin catalysts of the type according to EP-A No. 45,090 and DE-A Nos. 2,657,413, 2,547,526 and 2,772,658 are particularly useful.

Other catalytically active compounds which may be used in the present invention are described in DE-B No. 2,759,398, column 6, line 52 to column 7, line 54, and in Kunststoff-Handbuch, Volume VII, published by Vieweg and Hochtlen, Carl-Hanser-Verlag, Munich 1966, e.g. on pages 96–102.

In the process of the present invention the individual components may be mixed together in virtually any sequence or preliminary mixtures of several components may be combined. However, mixing of the isocyanate component with the alkaline component without the addition of water and/or polyol should be avoided because the monomeric polyisocyanate tends to undergo rapid trimerization under these conditions.

Three basic reaction patterns may be distinguished according to whether isocyanate is the first component to be introduced into the reaction chamber or isocyanate is added or isocyanate and polyol component are fed into the reaction chamber simultaneously. Each of these three basic patterns has certain special features but there are also problems which are common to all three types. The first two patterns are discontinuous whereas the third may be carried out continuously. It is in this continuous form that the present invention is particularly advantageous because polyol, isocyanate and other components may be introduced continuously. These three basic reaction patterns are discussed in detail below.

In one embodiment of the present invention, the isocyanate may be introduced without solvent or it may be introduced as a solution or it may be added to a virtually anhydrous solvent already present in the reaction chamber. Either all or part of the total quantity of solvent used may be present in the reaction vessel before introduction of the isocyanate compound. Any remaining solvent may be used to dissolve the isocyanate compound and introduced with this dissolved isocyanate into the reaction chamber. The solvent may also be added separately from the isocyanate compound or substantially at the same time or at any other point in time, optionally in combination with one or more components.

If the reaction vessel already contains the isocyanate and optionally the high molecular weight isocyanate-reactive compound with possibly a certain proportion but not the whole amount of at least partly water-miscible solvent, then the next component to be added is preferably the high molecular weight and/or low molecular weight compounds having the H-active groups, or a mixture of such compounds. The compounds containing H-active groups may be used alone or in combination with a certain proportion of solvent. The low molecular weight compound containing H-active groups may also be added in combination with a urethanization catalyst of known type. The addition of basic catalysts such as alkali metal hydroxides or tertiary amines at this stage and simultaneously with the high molecular weight compound containing H-active groups is not particularly recommended because it may cause uncontrolled reactions.

The base and water may be added after the addition of solvent or towards the end, e.g. when about half the solvent has been added. The base and water are preferably added in the form of an aqueous solution or dispersion which preferably contains all of the base and water required. However, the water and base may also be added separately, optionally mixed with all or part of the solvent. It is immaterial whether water or basic catalyst is added first but if water is the first to be added, the base should be added sufficiently soon thereafter in order to avoid urea formation (if this is undesirable in any particular case). For practical reasons, however, it is more preferred to add solvent and water in the form of an aqueous solution or dispersion/emulsion or, if solvent and water are not sufficiently miscible, to add them separately but simultaneously.

Mixing is carried out at reaction temperatures of from −20° C. to 175° C. If no external pressure is applied, as is preferable, the temperature range employed is from −20° C. to 100° C. or at most up to the boiling point of the solvent mixture if this is below the boiling point of water. The preferred temperature range is from 0° C. to 80° C., especially from 20° C. to 60° C. It is most preferred to operate at room temperature without external heating or cooling. The heat of reaction produced is slight and easily controlled, provided the base and the isocyanate monomer are not directly mixed together.

The isocyanate and solvent or portions thereof may be mixed together virtually instantaneously, i.e. within about 1 to 30 seconds. The low molecular weight isocyanate-reactive compound may also be added virtually instantaneously (e.g. within 1 second to 2 minutes) or it may also be added over a period of from about 10 minutes to 30 minutes. The addition of water or of the aqueous solution of base or of the base followed by the addition of water to the reaction mixture of isocyanate component and high molecular weight isocyanate-reactive compound and optionally also solvent may be carried out at various stages. If for example, water is added before the base, then the water may be added together with the low molecular weight isocyanate-reactive compound after the addition of high molecular weight isocyanate-reactive compound. If the base is used in the form of an aqueous solution or dispersion or if water and base are in some other manner introduced simultaneously into the reaction vessel, the base may be added at a stage when about half of the high molecular weight isocyanate-reactive compound has been added or the base may be added after the addition of the high molecular weight isocyanate-reactive compound has been completed (e.g. up to 6 hours after all of the high molecular weight isocyanate-reactive compound has been added).

In another embodiment of the present invention, the isocyanate is added to the high molecular weight isocyanate-reactive compound and optionally the low molecular weight isocyanate-reactive compound which has been introduced into the reaction chamber as a mixture with at least part of the water, solvent and basic catalyst. If the isocyanate and high molecular weight isocyanate-reactive compound are mixed together without the addition of water, solvent and basic catalyst, the process would be a variation of the first embodiment described above.

The high molcular weight isocyanate-reactive compound contains part or preferably all of the water, solvent and particularly basic catalyst in a dissolved or dispersed state. This reaction mixture is preferably a clear, monophasic solution. The isocyanate is then added, optionally as a solution in part or all of any solvent used. After addition of the isocyanate component, a further quantity of solvent (e.g. to facilitate stirring or effect phase separation), remaining quantities of water and remaining quantities of the base or of other bases may be added. The quantity of base present as a mixture with the high molecular weight isocyanate-reactive compound before the addition of the isocyanate is from 10 to 100% of the total quantity of base used. Any remaining quantities of water, solvent and base not introduced with the high molecular weight isocyanate-reactive compound may be added not only after but also during the addition of the isocyanate.

The general temperature limits for this embodiment are preferably from 20° C. to 60° C. Addition of isocyanate may be carried out, for example, within 1 second to 10 hours but preferably from 10 to 60 minutes.

In a particularly preferred variation of this embodiment of the present invention, two reaction components are prepared and worked up on a continuously operating mixing machine. The first component is made up of isocyanate and optionally all or a portion of the solvent, and the second component is made up of the remaining reactants.

In a third embodiment of the present invention, a mixture of base, water and optionally solvent is introduced into the reaction chamber. All or only a part of the total quantity of base and/or water may be introduced initially. If only part of the base and water is initially introduced, the remainder may be added simultaneously with the high and low molecular weight isocyanate-reactive compounds and solvent optionally in the form of a solution or mixture with either or both of the isocyanate-reactive compounds. The remaining base and water may also be added partly or completely after the addition of solvent and high and low molecular weight isocyanate-reactive compounds has been completed.

The isocyanate which in this embodiment may also contain part or all of the solvent, and the isocyanate-reactive compound(s) are generally introduced simultaneously into the reaction vessel which contains a mixture of base, water and optionally solvent.

The addition of the high and low molecular weight isocyanate-reactive compound(s) may also precede and/or follow the addition of the other components. A certain amount of isocyanate may also be added after the other components.

Numerous variations in the sequence of addition of the individual components are theoretically possible and it would be impossible to discuss these in detail. In general, however, in this embodiment all of the base and all of the water are first introduced into the reaction chamber and the isocyanate-reactive compound(s) is (are) added thereto as rapidly as possible. Any solvent, if used, may be distributed among the reactants as desired.

The temperature conditions useful in this third embodiment are the same as in the first and second embodiments described above but in this case, it is particularly preferred to operate at temperatures of 20° to 40° C. and to cool externally with ice, especially if no solvent is employed.

From what has been said above, it is obvious that numerous variations of the above-described embodiments are possible and that there is a virtually unlimited number of possible sequences in which the components may be mixed. In any event, however, the mixing of excess quantities of isocyanate with base or aqueous base should be avoided.

Only in the rarest cases will a solid crystalline product which may be isolated directly by filtration be obtained as the product of the present invention. The substance obtained by the process of the present invention will generally be a liquid, possibly heterogeneous reaction mixture. This mixture is heated to complete the conversion of isocyanate and amino groups or even to bring about this coversion if, for example, only a stable intermediate stage had previously been formed, which intermediate must be decomposed by heat (for example, a carbamate intermediate stage) and/or in order to distill off volatile material. If a higher temperature was employed when mixing the components, (e.g. without application of pressure at the boiling point of water or boiling point of solvent), then this temperature may be maintained. However, if a temperature of from 20° to 40° C. had been employed during mixing, the reaction mixture should preferably be heated to 60°-100° C. This heat treatment of the reaction mixture involves heating to temperatures from 20° to 175° C. (without application of external pressure) or preferably from 60°-110° C. This heat treatment may be combined with a further chemical treatment, preferably one which will bring about or accelerate the conversion of isocyanate groups into amino groups. In one such chemical treatment an acid compound, generally a strong mineral acid such as hydrochloric or sulfuric acid or a strong organic acid such as acetic or formic acid is added to the reaction mixture. The acid may be used in virtually any quantity although it is preferably equivalent to the quantity of base used. Apart from such mineral and strong organic acids, acid ion exchange resins may also be used. Another example of a chemical treatment which may be used in combination with heat treatment is the addition of a solvent which has a very pronounced dissolving action on the amine to be produced. Such solvent removes the amine from the decomposition equilibrium by the formation of two phases and thereby accelerates amine formation.

Carbon dioxide may be liberated both when working up the reaction mixture and when mixing the components. It may therefore be necessary to prevent excessive foaming of the reaction mixture. Vigorous foaming may also occur as a result of the action of acid on the reaction mixture. When alkali metal hydroxides are used as the base, if the corresponding alkali metal bicarbonates are obtained in a very finely divided state, foaming may also occur.

Mixing of the components may be followed by a stage of working up which is carried out at an elevated temperature (20° to 175° C., preferably 60° to 100° C.) and preferably at normal pressure but optionally at a slightly reduced pressure, e.g. at 200 to 700 Torr. Excess pressure is less preferred. After completion of this stage of working up, the formation of amino groups from isocyanate groups, possibly via intermediate stages, is completed.

If the reaction mixture, which is at a temperature of from 20° to 175° C. (preferably from 60° to 100° C.) and preferably at normal pressure, contains the product as a solid substance, then this solid amine product may be separated by filtration, optionally under pressure, centrifuging, etc., optionally after cooling, e.g. to 20° C. The separated product may then be purified by known methods.

If the reaction mixture contains a solid product which is not or is only to a slight extent the desired amine product, e.g. solid catalyst or a salt, then the reaction mixture may be filered or centrifuged either hot or after cooling. The solid substance may also be separated by some other means. Suction filtration is necessary if solid by-products or other solid reactants are present. A solid amine product is not normally separated by filtration if other solids such as reactants and/or by-products are also present. If, however, it is reasonably certain that no further solid substances will form apart from that which has already precipitated, then it is advantageous to separate the solid amine immediately. The reaction mixture or the filtrate is then generally freed from volatile constituents. The volatile constituents to be distilled from the reaction mixture include at least water and possibly also low molecular weight diamine (due to conversion of the isocyanate groups of the diisocyanate into amino groups), low boiling starting components containing isocyanate reactive groups, volatile catalysts (e.g. tertiary amines) and solvents. Distillation may be carried out at normal pressure or, preferably, at reduced pressure. It is preferred to distill first at a pressure such as 10 to 700 mbar and then at a pressure such as 0.01 to 10 mbar. Distillation is carried out at a sump temperature of from 20° to 175° C. and the sump temperature may be increased as the pressure falls (e.g. from 60° to 110° C.).

When all the volatile constituents or the desired volatile constituents have been distilled off, filtration is again carried out, preferably at 40° to 100° C., most preferably at 80° to 95° C., optionally at a pressure such as 1 to 3 bar using a heatable suction pressure filter. If any solid substances are difficult to separate by suction filtration, it may be necessary to take them up again with solvent and filter and distill again.

If the completely reacted mixture obtained after working up or after mixing is diphasic (which depends mainly on the character of the isocyanate reactive compounds used and on the solvent or system of water/solvent as well as on any salt content present in the reaction mixture), then the two phases may be separated in a separating funnel by running off the lower phase. The phase containing the amine product may then be worked up as described above while the other phase is discarded or regenerated.

Ideally, one isocyanate group from each diisocyanate should react with an isocyanate-reactive group other than water to form an isocyanate adduct (generally a urethane) while the other isocyanate group is hydrolyzed to form an amino group. This, however, rarely occurs. Various proportions of isocyanate groups to isocyanate-reactive groups are therefore selected according to the desired properties of the end product. The quality of the product is also influenced by the quantity and the nature of the catalyst.

If it is desired to have as few isocyanate reactive groups as possible remaining from the isocyanate-reactive compounds (i.e. the isocyanate-reactive compound(s) should undergo virtually complete reaction) then more than twice the number of isocyanate groups for each isocyanate-reactive group should be used. The ratio of isocyanate groups to isocyanate-reactive groups will preferably be within the range of from 2.1:1 to 10:1, most preferably from 2.5:1 to 5:1.

If, however, it is desired that virtually no free, monomeric, low molecular weight diamine should be left in the end product, then a ratio of isocyanate-reactive groups to isocyanate groups of from 1:0.1 to 1:1 should be used, preferably from 1:0.2 to 1:0.8. The amine monomer content of the product may also be lowered by other measures such as distillation, particularly if the ratio of isocyanate groups to H-active groups is greater than 1 and especially if it is greater than 2.

A ratio of isocyanate groups to isocyanate-reactive groups in the range of 1:1 to 2.1:1 is preferred for purposes of this invention. The product when these preferred ratios are used is in the form of a distinct three-component product mixture made up of residues of the isocyanate-reactive compound(s), residues of the isocyanate converted into the amine and the desired end product obtained by hydrolytic decomposition of the isocyanate groups of an intermediate product formed from this isocyanate and isocyanate-reactive compound(s).

It would, of course, be theoretically possible to employ any desired proportion of isocyanate groups to isocyanate-reactive groups, but no advantage is to be gained from an excessive predominance of any one of these two types of reactive groups. A very large excess such as a 20- to 50-fold excess, is pointless.

Water is essential for conversion of the isocyanate groups into $CO_2$ (or salts of $CO_2$ and base) and amino groups. The minimum quantity of water required depends upon the ratio of isocyanate groups to isocyanate-reactive groups, which is a measure of the quantity of isocyanate groups theoretically remaining to be hydrolyzed. The exact number of isocyanate groups remaining to be hydrolyzed need not be known, however, because water is used in large excess. The more than 10 equivalents, preferably more than 50 and most preferably more than 100 equivalents of water should be provided for each equivalent of isocyanate groups remaining to be hydrolyzed.

The quantity of solvent used for mixing the other components (excluding the quantities of solvent optionally used for any working up steps such as reducing the viscosity or bringing about the formation of a diphasic mixture) is generally from 1 to 5000 parts, preferably from 10 to 2500 parts, most preferably from 50 to 1000 parts, based on 100 parts of isocyanate.

The quantity and nature of the basic catalyst depends upon the quantity and nature (in particular, the hydrophilic or hydrophobic character and reactivity) of the isocyanate and isocyanate-reactive compound(s) as well as the nature of the basic catalyst. If the process is carried out in a heterogeneous-aqueous medium or in an exclusively aqueous medium, it is preferred to use alkali metal and alkaline earth metal hydroxides which form an intermediate carbonate stage. However, if the process of the present invention is carried out in a homogeneous phase using solvents, it is preferred to use catalysts of the tertiary amine type or (bi)carbonates or carboxylates.

When the reaction is carried out in an aqueous medium, from 1 to 10 equivalents, preferably from 1 to 6 equivalents of hydroxide groups are generally added for each equivalent of isocyanate group although the quantity of hydroxide ions added may, of course, be greater or smaller (e.g. from 0.1 to 0.99 equivalents to 1 equivalent of isocyanate groups). When greater amounts of hydroxide are used (i.e., greater than 10 equivalents) no improvement in the product and no other advantages are obtained. When smaller amounts of hydroxide (i.e., 0.1 to 0.99 equivalents) to each equivalent of isocyanate are used, the conversion rate of $NCO/NH_2$ progressively decreases and low molecular weight urea formation progressively increases so that poorer product quality is generally obtained.

The quantities of other basic, non-volatile, organic or inorganic catalysts (such as carbonates, bicarbonates, or pseudohalogen salts) which are preferably used when solvents are used, generally amount to 0.01 to 10 wt. %, based on 100 wt. % isocyanate, although the quantities of catalytically active substance added may also be substantially larger. Even greater proportions may be added if volatile, liquid organic bases of the tertiary amine type are used. These tertiary amines may even be used as solvents. Thus, from 0.01 to 1000 wt. %, preferably from 1 to 100 wt. %, most preferably from 2 to 10 wt. % of base of the tertiary amine type may be used for 100 wt. % isocyanate. These bases are particularly advantageously used if the process is to be carried out on a reaction mixture which is not substantially aqueous-homogeneous.

The urethanization catalysts which may optionally be used are generally added in quantities of from 0.001 to 10 wt. %, preferably from 0.01 to 5 wt. %, most preferably from 0.02 to 2 wt. %, based on low molecular weight isocyanate-reactive compound. Catalysts based on tin, lead or bismuth compounds are preferred.

The reaction mixtures may also contain other auxiliary agents, such as defoaming agents or emulsifiers, in quantities of from 0.01 to 5 wt. %.

The polyamines or amine-containing reaction mixtures obtained after working up are generally colorless to slightly colored, viscous to high viscous and in some cases relatively high melting product and have an amino group content of from 0.1 to 25 wt. %. Depending upon the starting materials used, these polyamine products may contain ether and/or acetal and/or carbonate and/or ester and/or thioether and/or dialkylsiloxane groups and/or the residues of polybutadienes which were already present in the compounds containing "H-active groups".

The polyamine products also contain groups formed by the reaction of isocyanate components with the isocyanate-reactive groups ("H-active groups") from the starting materials, in particular urethane and/or urea groups, as well as allophanate and/or biuret groups formed from these by secondary reactions.

Additional bonds may also be formed by side reactions. For example, urea groups may be formed from already saponified portions and remaining isocyanate groups during the hydrolysis reaction. The quantity of primary aromatic amino groups present in the polyamines is at most equal to the quantity of isocyanate groups in the isocyanate starting material minus the amount of amino groups which reacted with the isocyanate starting material or in side reactions or secondary reactions. The amine content corresponds approximately to the amine contents of the products formed according to German Offenlegungsschrift No. 3,039,600 i.e., about 0.1 to 25 wt. %, preferably about 0.2 to 10 wt. %, most preferably 0.5 to 5 wt. % of $NH_2$ groups.

Isocyanate groups attached to aliphatic residues give rise to highly reactive aliphatic amines as products of hydrolysis which amines are capable of reacting very rapidly with any isocyanate groups still present to form urea compounds and thus yield relatively high molecular weight polyurea amines with a low $NH_2$ content in most cases.

The products obtained by the process of the present invention which preferably contain aromatic amino groups, are preferred (due to their low vapor pressure) as reactants for blocked or free polyisocyanates in the production of polyurethanes (polyurethane ureas), cellular or non-cellular polyurethane plastics or polyurethane foams, optionally combined with other low molecular weight (molecular weight 32 to 399) and/or relatively high molecular weight (molecular weight 400 to ca. 12000) compounds containing isocyanate-reactive groups. Suitable starting components for the production of polyurethane resins or plastics have been described above in the context of prepolymer preparation as well as in DE-A Nos. 2,302,564; 2,432,764 (U.S. Pat. No. 3,903,679); 2,639,083; 2,512,385; 2,513,815; 2,550,796; 2,550,797; 2,550,833; 2,550,860 and 2,550,862. These documents also disclose auxiliary agents and additives which may be used for the production of polyurethanes. The polyamines of the present invention may be used, for example, for elastomers, coatings, threads applied from solvent-free melts, solutions or dispersions, or as reactive component mixtures. Other applications of the polyamines of the present invention include their use as coupling components for diazo dyes, as hardeners for epoxide and phenol resins and all other known reactions of amines, such as the formation of amides or imides, and others.

The examples which follow serve to illustrate the process of the present invention. The quantities given are to be understood as parts by weight or percentages by weight, unless otherwise indicated.

EXAMPLES

Example 1

A mixture of 2 kg of a polyether diol (OH number 56 containing 80 wt. % of propylene oxide units and 20 wt. % ethylene oxide units arranged in end positions), 3 g of dibutyl tin-IV-bis-p-tosylate (used as hydrolysis resistant urethanization catalyst) in the form of a solution in 10 ml of dimethylformamide (DMF), 160 g (4 mol $OH^{(-)}$) of sodium hydroxide, 1 g of the emulsifier sold under the name of Mersolat H ® (a product of Bayer AG) and 500 g of water were introduced into the reaction vessel. 348 g (2 mol) of 2,4-diisocyanato-toluene were added within 70 minutes with vigorous cooling, using an ice bath, and continued stirring. The temperature in the reaction vessel was maintained at 22° to 30° C. Stirring was continued for a further 10 minutes at 30° C., and the reaction mixture was then freed from isocyanate groups. The reaction vessel was heated to 80° C. for 2 hours, and vigorous evolution of gas was observed when a temperature of about 60° C. was reached. Water and a small quantity of DMF were distilled off, first at 100° C./20 mbar and then at 100° C./1 mbar. The precipitated salt was filtered off. The properties of the product amine are given in Table 1.

Example 2

A reaction mixture identical to that of Example 1 was prepared and worked up exactly as in Example 1 except that no urethanization catalyst (i.e., dibutyl tin-IV-bis-p-tosylate) and no DMF were used. The properties of the product are given in Table 1.

Example 3

A mixture of 2 kg of the polyether diol from Example 1, 1 kg of dimethylformamide, 500 g of water, 160 g of sodium hydroxide and 1 g of Mersolat ® was introduced into the reaction vessel. 348 g of 2,4-diisocyanato-toluene were added within 40 minutes with vigorous stirring and rapid cooling, using an ice bath. The temperature in the reaction vessel was maintained at 25° to 27° C. and stirring was then continued at this temperature for 15 minutes. Dimethylformamide and water were then distilled off at a bath temperature of 100° C., first at 20 mbar and then at 0.1 mbar pressure. The precipitated salt was filtered from the residue. The properties of the product amine are given in Table 1.

Example 4

A mixture of 2 kg of the polyether diol from Example 1 (2 mol of hydroxyl groups), 3 g of the dibutyl tin-IV-bis-p-tosylate mixture from Example 1, 160 g of sodium hydroxide (4 mol), 500 g of water (27.8 mol) and 1 g of Mersolat H ® was introduced into the reaction vessel. 348 g (2 mol) of 2,4-diisocyanato-toluene (4 mol of isocyanate groups) in the form of a solution in 500 ml of acetone were added within 45 minutes with vigorous stirring and rapid cooling, using an ice bath. The temperature of the reaction mixture was maintained at 22°–30° C. and stirring was then continued at this temperature for 10 minutes. The reaction mixture was heated to 60° C. for 2 hours. Sudden, vigorous evolution of gas was observed when the temperature reached 60° C. The reaction mixture was suction filtered. Acetone and water were distilled off at reduced pressure and the residue was again suction filtered. The properties of the product amine are given in Table 1.

Example 5

Example 5 was carried out using the same reaction mixture, method of reaction and working up as in Example 4 except that the 500 ml of acetone were not mixed with the isocyanate component but with the "$H_2O$ component". The evolution of gas which set in at 60° C. was even more vigorous. The properties of the product amine are given in Table 1.

Example 6

A mixture of 1 kg of the polyether diol from Example 1, 1.5 g of dibutyl tin-IV-bis-p-tosylate in 20 ml of DMF, 200 g of water (11.1 mol), 200 g of methyl ethyl ketone, 0.2 g of Mersolat H ® and 106.8 g of sodium hydroxide (2.67 mol) was introduced into the reaction vessel. 232 g (1.33 mol of 2,4-diisocyanatotoluene (2.67 mol of NCO) were added within 45 minutes with vigorous stirring and rapid cooling, using an ice bath. The temperature of the reaction mixture was maintained at 20° to 30° C. The mixture was then heated to 80° C. for 3 hours without further stirring. No sudden evolution of gas occurred. Removal of the solvent and water by distillation and separation of the salt were carried out in the same manner as described in Example 1. The properties of the product amine are given in Table 1.

Example 7

A mixture of 2 kg of the polyether diol from Example 1 (2 mol of hydroxyl groups), 2 g of dibutyl tin-IV-bis-p-tosylate dissolved in 20 ml of DMF, 400 g of water (22.2 mol), 400 g of 2.5-dimethyl-tetrahydrofuran, 106.8 g of sodium hydroxide (2.67 mol) and 0.4 g of Mersolat H ® was introduced into the reaction vessel. 232 g (1.33 mol) of 2,4-diisocyanatotoluene (2.67 mol of isocyanate groups) were added with vigorous stirring and rapid cooling within 30 minutes at a reaction temperature of 20° to 30° C. The reaction mixture was heated to 60° C. for 150 minutes without further stirring and then freed from precipitated salts. Solvent and water were distilled off and the reaction mixture was again filtered. The properties of the product amine are given in Table 1.

Example 8

348 g (2 mol) of 2,4-diisocyanatotoluene heated to 40° C. were introduced into the reaction vessel. A mixture of 2 kg of the polyether diol from Example 1 (2 mol of hydroxyl groups) and 2 g of dibutyl tin-IV-bis-tosylate dissolved in 40 ml of DMF was added within 5 minutes. Exothermic heating of the reaction mixture to 60° C. took place. When addition of the mixture of polyether diol and tin catalyst had been completed, a mixture of 160 g (4 mol) of sodium hydroxide, 500 ml of water and 200 ml of acetone was added dropwise within 30 minutes without cooling. After the reaction mixture had cooled down, it was taken up in 2 liters of methanol and suction filtered. The filtrate was distilled and again suction filtered, as described in Example 1. The properties of the product amine are given in Table 1.

Example 9

A mixture of 2 kg of the polyether diol from Example 1 (2 mol of hydroxyl groups), 3 g of the tin catalyst from Example 1 dissolved in 10 ml of DMF, 500 g of water, 160 g (4 mol) of sodium hydroxide and 1 g of Mersolat H ® was introduced into the reaction vessel. When the reaction temperature had been reduced to 22°–26° C. by cooling with an ice bath, 500 g of a mixture of 50 wt. % 2,4- and 50 wt. % 4,4′-diisocyanatodiphenylmethane (4 mol of NCO) were added within 80 minutes with vigorous stirring. After the addition of two thirds of the quantity of isocyanate, an additional 500 g of water were added. The reaction mixture was then heated to 80° C. for one hour and the water was distilled off in a vacuum produced by a water jet pump. After the addition of 1 liter of methanol, the reaction mixture was filtered, methanol and any remaining other volatile components were distilled off and the mixture was again filtered. The properties of the product amine are given in Table 1.

Example 10

A mixture of 2 kg of a polypropylene glycol with OH number 56 (2 mol of hydroxyl groups), 3 g of the tin catalyst from Example 1 as a solution in 40 ml of DMF, 160 g of sodium hydroxide, 400 g of water, 400 g of acetone and 0.4 g of Mersolat H ® was introduced into the reaction vessel. 348 g of 2,4-diisocyanatotoluene (4 mol of NCO) were added dropwise within 30 minutes at a reaction temperature of 30° to 40° C. with cooling and vigorous stirring. The reaction mixture was then heated to 60° C. for 30 minutes and 80° C. for a further 60 minutes. The volatile components were removed by distillation, first at 20 mbar and later at 1 mbar and the reaction mixture was freed from salt by suction filtration. The properties of the product amine are given in Table 1.

Example 11

A mixture of 194 g of tetraethyleneglycol (2 mol of hydroxyl groups), 0.5 g of the tin catalyst from Example 1, dissolved in 10 ml of DMF, 160 g of sodium hydroxide, 1 liter of water and 1 g of Mersolat H ® was introduced into the reaction vessel. 348 g of 2,4-diisocyanatotoluene (4 mol of NCO groups) were added within 60 minutes of vigorous stirring at a reaction temperature of 20° to 30° C. Stirring was then continued for 30 minutes at 60° C. and for one hour at 80° C. Undissolved constituents were filtered off and the filtrate was distilled at reduced pressure and then suction filtered again. The properties of the product amine are given in Table 1.

Example 12

The procedure described in Example 11 was repeated using 240 g instead of 160 g of sodium hydroxide. The product had the properties shown in Table 1.

Example 13

A mixture of 1.5 kg of a polyether triol with OH number 27 (0.75 mol of hydroxyl groups) started on trimethylolpropane and containing 22 wt. % ethylene oxide units in end positions and 78 wt. % propylene oxide units, 0.75 g of the tin catalyst from Example 1 in 10 ml of DMF, 40 g of sodium hydroxide (1 mol of $OH^{(-)}$, 100 g of water, 100 g of acetone and 0.1 g of Mersolat H ® was introduced into the reaction vessel. 87 g of 2,4-diisocyanatotoluene were added within 30 minutes with vigorous stirring at a reaction temperature of 20° to 30° C. The reaction mixture was then heated to 60° C. for 2 hours, during which time the viscosity of the product mixture was substantially reduced. The reaction mixture was suction filtered while still hot, the volatile constituents were distilled off and the mixture was again filtered. The properties of the product amine are given in Table 1.

Example 14

The procedure described in Example 13 was repeated using 2 kg of polyether triol instead of 1.5 kg thereof. The product had the properties indicated in Table 1.

Example 15

The procedure described in Example 13 was repeated using 1 kg of polyether triol instead of 1.5 kg thereof. The product had the properties indicated in Table 1.

Example 16

A mixture of 1.5 kg of the polyether triol from Example 13, 0.75 g of tin catalyst from Example 1 in 10 ml of DMF, 5 g of potassium bicarbonate, 50 g of water and 1 liter of dimethylformamide was introduced into the reaction vessel. 130.5 g of 2,4-diisocyanatotoluene (1.5 mol of isocyanate groups) were added within one hour at a reaction temperature of 20° to 30° C. with vigorous stirring. 7.2 liter of $CO_2$ evolved. The reaction mixture was then heated to 100° C. for 3 hours and filtered while hot. The filtrate formed two phases on cooling. The lower amine phase was separated, freed from residues of solvent and water by distillation and again filtered to remove minute quantities of insoluble residues. The upper phase was discarded. The properties of the product amine are given in Table 1.

TABLE 1

| Example | Primary Nitrogen [%][1] | NH No. [mg KOH/g][2] | Total Nitrogen [%][3] | NH No. [mg KOH/g][4] | Acid No. [mg KOH/g][5] | Viscosity [mPa.s] at 30° C.[6] |
|---|---|---|---|---|---|---|
| 1 | 1.71 | 68.5 | 2.57 | 97.95 | 0.03 | 2500 |
| 2 | 1.74 | 69.6 | 2.53 | 100 | 0.09 | 3500 |
| 3 | 0.18 | 6.4 | 1.88 | 46.9 | 0.2 | 2200 |
| 4 | 1.63 | 65.2 | 2.40 | 92.9 | 0.1 | 3200 |
| 5 | 1.26 | 49.2 | 2.35 | 82.2 | 0.3 | 2900 |
| 6 | 1.62 | 64.9 | 3.22 | 82.2 | 0.6 | 2600 |
| 7 | 1.01 | 40.15 | 1.76 | 68.35 | 0.3 | 3400 |
| 8 | 1.54 | 61.65 | 2.64 | 85,85 | 0.4 | 4100 |

| Example | Primary Nitrogen [%] | NH No. [mg KOH/g][2] | Total Nitrogen [%][3] | OH + NH - NO [mg KOH/g][4] | Acid No. [mg KOH/g][5] | Viscosity [mPa.s] at 30° C.[6] |
|---|---|---|---|---|---|---|
| 9 | 1.74 | 69.7 | 2.36 | 99.15 | 0.7 | 6000 |
| 10 | 1.87 | 74.96 | 2.53 | 114 | 0.1 | 5300 |
| 11 | 9.16 | 367.4 | 11.56 | 548 | 2.4 | 1780 |
| 12 | 10.6 | 425 | 12.21 | 572 | <0.1 | 200 |
| 13 | 0.62 | 24.8 | 1.19 | 42.1 | 0.1 | 500 |
| 14 | 0.47 | 18.83 | 0.78 | 32.6 | 0.05 | 630 |
| 15 | 1.05 | 42.15 | 1.38 | 51.15 | 0.02 | 2300 |
| 16 | 0.39 | 15.6 | 1.24 | 40.25 | 0.2 | 1400 |

[1]Titration with perchloric acid
[2]By calculation from[1]
[3]According to Kjeldahl
[4]Acetic anhydride method (24 h/20° C. determines OH and $NH_2$ groups)
[5]Determined together with[4]
[6]By rotation viscosimeter.

TABLE 2

| Example No. | OH:OH NCO[A] | (OH + NH) number [mg KOH/g][B] | idealized NH No. [mg KOH/g][C] | % monomeric diamine[D] (calculated from Table 1) | expected % monomeric diamine[E] (without urethanisation) | prim/sec.[F] |
|---|---|---|---|---|---|---|
| 1 | 1:2:2 | 149.7 | 49.9 | 2.27 | 20.9 | prim. |
| 2 | 1:2:2 | 149.7 | 49.9 | 2.51 | 23.1 | prim. |
| 3 | 1:2:2 | 149.7 | 49.9 | 0 | — | prim. |
| 4 | 1:2:2 | 149.7 | 49.9 | 2.29 | 21.1 | prim. |
| 5 | 1:2:2 | 149.9 | 49.9 | 0.45 | 4.14 | prim. |
| 6 | 1:2.67:2.67 | 176.6 | 80.2 | 0.05 | 0.36 | prim. |
| 7 | 2:2.67:2.67 | 120.8 | 24.7 | 0.69 | 9.17 | prim. |
| 8 | 1:2:2 | 149.7 | 49.9 | 1.20 | 11.0 | prim. |
| 9 | 1:2:2 | 149.7 | 49.9 | 2.98 | 18.0 | prim. |
| 10 | 1:2:2 | 149.7 | 49.9 | 3.2 | 29.4 | sec. |

TABLE 2-continued

| Example No. | OH:OH NCO[d] | (OH + NH) number [mg KOH/g][B] | idealized NH No. [mg KOH/g][C] | % monomeric diamine[D] (calculated from Table 1) | expected % monomeric diamine[E] (without urethanisation) | prim/sec.[F] |
|---|---|---|---|---|---|---|
| 11 | 1:2:2 | 767.1 | 255 | 18.0 | 32.3 | prim. |
| 12 | 1:3:2 | 767.1 | 255 | 23.9 | 42.9 | prim. |
| 13 | 0.75:1:1 | 61.8 | 25.4 | 0.13 | 3.33 | prim. |
| 14 | 1:1:1 | 99.95 | 0 | 0.43 | 14.5 | prim. |
| 15 | 1:2:2 | 78.22 | 25.5 | 1.91 | 33.2 | prim. |
| 16. | 1:2 | 78.22 | 25.5 | 0 | — | prim. |

Legend to Table 2:
[d]Equivalent ratio of hydroxyl groups to hydroxide groups to NCO groups.
[B]Sum of OH number and NH number which would be obtained when no urethanization would have taken place and all NCO groups would have been converted into NH$_2$ groups and all polyols would be unreacted.
[C]NH number obtained when an "ideal" isocyanate prepolymer is prepared using the proportions indicated under [d] and all the NCO groups of this "ideal" prepolymer are converted into amino groups (by calculation).
[D]Proportion of monomeric diamine in the isolated reaction product in wt. % (by calculation from experimental values of table 1)
[E]Expected proportion of monomeric diamine, based on the quantity of diisocyanate put into the reaction ( = 100 wt. %) in wt. % (by calculation), if no urethanisation would have occurred and all diisocyanate would be converted to diamine.
[F]Primary or secondary character of the OH groups of the polyol put into the process.

Table 1 gives experimental values, as determined from the reaction products; table 2 gives mostly theoretical values under different assumptions: (B) no urethanization reaction occured, (C) full urethanisation to an NCO-prepolymer occured before hydrolysis of NCO to NH$_2$, (E) is expected diamine content, if according assumption (B) all free diisocyanate would be hydrolyzed to monomeric diamine. Actually the found NH-No (2) is greater than the calculated NH-No (C), because of some diisocyanate is transformed into monomeric diamine (D) without prepolymerisation. This leaves some unreacted OH-groups, so that the actual OH+NH$_2$-value (4) is greater the NH-No (2) alone, but less than OH+NH$_2$-No(B) without urethanisation reaction.

This shows, that in the one step-reaction part of the polyols and diisocyanates reacted first to NCO-prepolymer and is only thereafter hydrolized to amines, but it demonstrates also, that part of the diisocyanate is hydrolized directly and that some of the OH-groups of the polyols are left unchanged.

A small part of NCO-groups may also be transformed to urea-groups by reaction with water.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of relatively high molecular weight aromatic polyamines linked by urethane groups to segments of relatively high molecular weight compounds comprising
    (a) hydrolyzing
        (i) a polyisocyanate having an isocyanate content of from 21 to 52.5 wt. % which polyisocyanate is not a preformed isocyanate prepolymer or semi-prepolymer in presence of
        (ii) an isocyanate-reactive group-containing compound having a molecular weight of from 400 to 10,000 at an isocyanate to isocyanate-reactive group equivalent ratio of from 0.1 to 5 mixed with
        (iii) water in an amount such that the equivalent ratio of water to isocyanate groups is greater than 1 and
        (iv) a basic catalyst and
    (b) isolating the product amine from the reaction mixture of (a).

2. The process of claim 1 in which (v) an isocyanate-reactive compound having a molecular weight of from 62 to 399 is present in the hydrolysis mixture in an amount such that the equivalent ratio of isocyanate (i) to total isocyanate-reactive compounds (ii+v) is from 0.1 to 5.

3. The process of claim 2 in which the equivalent ratio of isocyanate (i) to total isocyanate-reactive compounds (ii+v) is from 0.5 to 2.

4. The process of claim 1 in which the hydrolysis mixture contains (vi) a solvent which is at least partially water-miscible.

5. The process of claim 4 in which the solvent (vi) is selected from the group consisting of ketones, carboxylic acid dialkylamines, lactams, nitriles and ethers.

6. The process of claim 1 in which the basic catalyst (iv) is selected from the group consisting of alkali metal hydroxides, alkaline earth metal oxides, alkaline earth metal hydroxides, alkali metal carbonates, alkaline earth metal carbonates, alkali metal bicarbonates, difficultly-soluble basic aluminum oxides, basic ion exchange resins, tertiary organic amines and mixtures thereof.

7. The process of claim 1 in which the catalyst (iv) is an alkali metal hydroxide.

8. The process of claim 1 in which the hydrolysis mixture further includes (vii) a urethanation catalyst based on compounds of tin, lead or bismuth.

9. The process of claim 1 in which the polyisocyanate (i) is a diisocyanate.

10. The process of claim 1 in which the polyisocyanate (i) is an aromatic polyisocyanate.

11. The process of claim 1 in which the isocyanate-reactive group containing compound (ii) is selected from the group consisting of polyether polyols, polyester polyols, polycarbonate polyols and polyacetal polyols.

12. The process of claim 1 in which prior to hydrolysis the reaction components are mixed at a temperature of from 20° to 130° C.

13. The process of claim 1 in which the product amine is isolated from the reaction mixture of (a) by phase separation, extraction or distillation.

14. A relatively high molecular weight aromatic polyamine linked by urethane groups to segments of relatively high molecular weight polyether, polyester polycarbonate or polyacetal polyols containing from 0.1 to 25 wt. % amino groups prepared by the process of claim 1.

15. A process for the production of polyurethanes in which the polyamine of claim 14 is reacted with a polyisocyanate.

* * * * *